United States Patent
Choi et al.

(10) Patent No.: US 8,554,002 B2
(45) Date of Patent: *Oct. 8, 2013

(54) METHOD AND APPARATUS FOR ENCODING AND DECODING AND MULTI-VIEW IMAGE

(75) Inventors: Jong-bum Choi, Yangju-si (KR); Woo-sung Shim, Yongin-si (KR); Hak-sup Song, Suwon-si (KR); Young-ho Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/399,368

(22) Filed: Feb. 17, 2012

(65) Prior Publication Data

US 2012/0148168 A1 Jun. 14, 2012

Related U.S. Application Data

(62) Division of application No. 12/027,518, filed on Feb. 7, 2008.

(60) Provisional application No. 60/907,614, filed on Apr. 11, 2007, provisional application No. 60/907,753, filed on Apr. 16, 2007.

(30) Foreign Application Priority Data

Jun. 29, 2007 (KR) .................. 10-2007-0065664
Jul. 6, 2007 (KR) .................. 10-2007-0068186

(51) Int. Cl.
*G06K 9/36* (2006.01)

(52) U.S. Cl.
USPC ........... 382/233; 382/232; 382/236; 382/238; 382/246; 382/250

(58) Field of Classification Search
USPC ......... 382/232, 233, 236, 238, 246, 250, 251; 348/400, 421, 394, 409
See application file for complete search history.

(56) References Cited

U.S. PATENT DOCUMENTS

2006/0222079 A1 10/2006 Park et al.
2006/0262856 A1 11/2006 Wu et al.

(Continued)

FOREIGN PATENT DOCUMENTS

KR 10-2006-0083053 A 7/2006
KR 10/2007/0022568 A 2/2007

(Continued)

OTHER PUBLICATIONS

"Series H: Audiovisual and Multimedia Systems, Infrastructure of audiovisual services—Coding of moving video", Advanced video coding for generic audiovisual services, ITU-T Telecommunication sector of ITU, Nov. 2007, 564 pages total.

(Continued)

*Primary Examiner* — Ali Bayat
(74) *Attorney, Agent, or Firm* — Sughrue Mion, PLLC

(57) ABSTRACT

A Method and apparatus for encoding and decoding a multi-view image are provided. The method of encoding a multi-view image includes determining whether each of pictures included in multi-view image sequences is a reference picture referred to by other pictures included in the multi-view image sequences for inter-view prediction, and encoding the pictures using at least one of inter-view prediction and temporal prediction based on the determination result, thereby efficiently encoding and decoding the multi-view image at high speed.

1 Claim, 11 Drawing Sheets

(56) References Cited

U.S. PATENT DOCUMENTS

| | | | |
|---|---|---|---|
| 2007/0030356 A1 | 2/2007 | Yea et al. | |
| 2007/0041443 A1 | 2/2007 | Ha et al. | |
| 2007/0064799 A1 | 3/2007 | Ha | |
| 2007/0121722 A1 | 5/2007 | Martinian et al. | |
| 2008/0130738 A1 | 6/2008 | Lee et al. | |
| 2009/0279608 A1 | 11/2009 | Jeon et al. | |
| 2009/0296811 A1 | 12/2009 | Jeon et al. | |
| 2010/0111170 A1* | 5/2010 | Koo et al. | 375/240.12 |
| 2010/0200252 A1* | 8/2010 | Naylor et al. | 172/1 |
| 2010/0215100 A1* | 8/2010 | Jeon et al. | 375/240.12 |

FOREIGN PATENT DOCUMENTS

| | | |
|---|---|---|
| KR | 10-2007-0055903 A | 5/2007 |
| KR | 10-2007-0098429 A | 10/2007 |
| KR | 10-2008-0007086 A | 1/2008 |
| WO | 2006062377 A1 | 6/2006 |
| WO | 2007114608 A1 | 10/2007 |

OTHER PUBLICATIONS

Chen, Y .et. al. "On MVC reference picture making", Joint Video Team (JVT) of ISO/IEC MPEG & ITU-T VCEG (ISO/ICE JTC1/SC29/VVG11 and ITU-T SG16 Q. 6), 22nd Meeting: Marrakech, Morocco, Jan. 13-19, 2007, pp. 1-8.
Communication dated May 21, 2012 issued by the European Patent Office in counterpart European Patent Application No. 08723299.7.
Communication dated May 16, 2012 issued by the European Patent Office in counterpart European Patent Application No. 12153703.9.
Communication dated May 15, 2012 issued by the European Patent Office in counterpart European Patent Application No. 12153705.4.
Communication dated May 15, 2012 issued by the European Patent Office in counterpart European Patent Application No. 12153706.2.
Communication dated May 14, 2012 issued by the European Patent Office in counterpart European Patent Application No. 12153702.1.
Communication dated May 14, 2012 issued by the European Patent Office in counterpart European Patent Application No. 12153707.0.
Communication dated May 11, 2012 issued by the European Patent Office in counterpart European Patent Application No. 08723299.7.
Communication dated May 14, 2012 issued by the European Patent Office in counterpart European Patent Application No. 12153708.8.
Martinian, et al., "V-Picture Syntax for Random Access in Multi-view Video Compression", Mitsubishi Research Labs, Montreux, Switzerland, Apr. 2006, 8 pages total.
Wang, et al., "Comments to JMVM 1.0", Nokia Corp., and Tampere University of Tech., vol. JVT-U103, Oct. 20, 2006, pp. 1-6, XP002478605.
Chen, et al., "MVC Reference Picture Management", Tampere University of Tech., and Nokia Corp., Oct. 20, 2006, pp. 1-9.
Communication dated May 15, 2012 issued by the Japanese Patent Office in counterpart Japanese Patent Application No. 2010-502926.
Communication dated May 22, 2012 issued by the Mexican Intellectual Property Office in counterpart Mexican Patent Application No. MX/a/2009/010933.
Communication, dated Aug. 9, 2012, issued by the Korean Intellectual Property Office in counterpart Korean Application No. 10-2010-0103141.
Notice of Allowance dated Nov. 18, 2010, issued in corresponding Korean application No. 10-2007-0068186.
Office Action dated Sep. 16, 2010, issued in corresponding Korean application No. 10-2007-0068186.
Communication dated Dec. 12, 2012 from the Korean Intellectual Property Office in counterpart application No. 10-2007-0065664.
Communication dated Jan. 6, 2013 from the State Intellectual Property Office of P.R. China in counterpart application No. 200880019798.7.
Communication dated Jan. 8, 2013 from the Japanese Patent Office in counterpart application No. 2010-502926.
Communication dated Apr. 9, 2013 issued by the Japanese Patent Office in counterpart Japanese Patent Application No. 2012-057571.
Communication dated Apr. 9, 2013 issued by the Japanese Patent Office in counterpart Japanese Patent Application No. 2012-057572.
Communication dated Apr. 9, 2013 issued by the Japanese Patent Office in counterpart Japanese Patent Application No. 2012-057573.
Communication dated Apr. 9, 2013 issued by the Japanese Patent Office in counterpart Japanese Patent Application No. 2012-057574.
Communication dated Apr. 9, 2013 issued by the Japanese Patent Office in counterpart Japanese Patent Application No. 2012-057575.
Communication dated Apr. 9, 2013 issued by the Japanese Patent Office in counterpart Japanese Patent Application No. 2012-057576.
Chen, et al., "On MVC reference picture marking", Joint Video Team of ISO/IEC MPEG & ITU-T VCEG (ISO/IEC JTC1/SC29/WG11 and ITU-T SG16 Q.6) JVT-V044, Jan. 13, 2007, pp. 1-8.
Communication dated Jun. 20, 2013 issued by the Mexican Intellectual Property Office in counterpart Mexican Application No. 2012002801.
Communication dated Jun. 20, 2013 issued by the Mexican Intellectual Property Office in counterpart Mexican Application No. 2012002799.

* cited by examiner

FIG. 5

```
nal_unit_header_svc_mvc_extension(){
    svc_mvc_flag
    if(!svc_mvc_flag){
    reserved_zero_one_bit
    priority_id
    temporal_level
    dependency_id
    quality_level
    idr_flag
    layer_base_flag
    use_base_prediction_flag
    discardable_flag
    reserved_zero_three_bits
    tl0_frame_idx_present_flag
    fragment_order
    } else{
      nal_ref_idc_view
        temproal_level
        view_level
        achor_pic_flag
        view_id
        idr_flag
      reserved_zero_four_bits
    }
    nalUnitHeaderBytes+=3
}
```

FIG. 6A

```
seq_parameter_set_mvc_extension(){
    num_views_minus_1
    temporal_level_max
    for(i=o; i<=num_views_minus_1; i++)
        view_id[i]
    for(i=0; i<=num_views_minus_1; i++){
        num_anchor_refs_l0[i]
        for(j=0; j<=num_anchor_refs_l0[i]; j++)
            anchor_ref_l0[i][j]
        num_anchor_refs_l1[i]
        for(j=0; j<=num_anchor_refs_l1[i]; j++)
            anchor_ref_l1[i][j]
    }
    for(i=0; i<=num_views_minus_1; i++){
        num_non_anchor_refs_l0[i]
        for(j=0; j<=num_non_anchor_refs_l0[i]; j++)
            non_anchor_ref_l0[i][j]
        num_non_anchor_refs_l1[i]
        for(j=0; j<=num_non_anchor_refs_l1[i]; j++)
            non_anchor_ref_l1[i][j]
    }
    for(i=1; i<=temporal_level_max; i++)
        use_interview_pred_temporal_level[i];
}
```

FIG. 6B

```
seq_parameter_set_mvc_extension(){
        num_views_minus_1
        temporal_level_max
        for(i=o; i<=num_views_minus_1; i++)
                view_id[i]
        for(i=0; i<=num_views_minus_1; i++){
                num_anchor_refs_l0[i]
                for(j=0; j<=num_anchor_refs_l0[i]; j++)
                        anchor_ref_l0[i][j]
                num_anchor_refs_l1[i]
                for(j=0; j<=num_anchor_refs_l1[i]; j++)
                        anchor_ref_l1[i][j]
        }
        for(i=0; i<=num_views_minus_1; i++){
                num_non_anchor_refs_l0[i]
                for(j=0; j<=num_non_anchor_refs_l0[i]; j++)
                        non_anchor_ref_l0[i][j]
                num_non_anchor_refs_l1[i]
                for(j=0; j<=num_non_anchor_refs_l1[i]; j++)
                        non_anchor_ref_l1[i][j]
                for(j=1; j<=temporal_level_max; j++)
                        use_interview_pred_temporal_level[i][j];
        }

```
Use_interview_prediction_temporal_level(payloadSize){
   temporal_level_max
      for(i=1; i<=temporal_level_max; i++) {
         use_interview_prediction_temporal_level[i][j];
      }
}
```

FIG. 6D

```
Use_interview_prediction_temporal_level(payloadSize){
(
   num_view_minus_1
   temporal_level_max
   for(i=0; i<= num_view_minus1;i++) {
      for(j=0; j<=temporal_level_max; j++) {
         use_interview_prediction_temporal_level[i][j];
      }
   }
}
```

METHOD AND APPARATUS FOR ENCODING AND DECODING AND MULTI-VIEW IMAGE

CROSS-REFERENCE TO RELATED PATENT APPLICATIONS

This is a divisional Application of U.S. Ser. No. 12/027,518 filed Feb. 7, 2008, which claims priority from U.S. Provisional Patent Application No. 60/907,614, filed on Apr. 11, 2007, and U.S. Provisional Patent Application No. 60/907, 753, filed on Apr. 16, 2007, in the U.S. Patent and Trademark Office, and Korean Patent Application No. 10-2007-0065664, filed on Jun. 29, 2007, and Korean Patent Application No. 10-2007-0068186, filed on Jul. 6, 2007, in the Korean Intellectual Property Office, the disclosures of which are incorporated herein in their entirety by reference.

BACKGROUND OF THE INVENTION

1. Field of the Invention

Methods and apparatuses consistent with the present invention generally relate to encoding and decoding a multi-view image, and more particularly, to encoding and decoding a multi-view image in order to perform inter-view prediction and temporal prediction that are required for encoding and decoding at high speed.

2. Description of the Related Art

In multi-view image encoding, images input from a plurality of cameras that provide a multi-view image are simultaneously encoded. The multi-view image is compression encoded using temporal correlation and inter-view spatial correlation.

FIG. 1 illustrates sequences of a multi-view image according to a related art.

In FIG. 1, a horizontal axis is a time axis and a vertical axis is a view axis. In multi-view image encoding, an intra (I) picture is periodically generated for an image from a base view and temporal prediction, or inter-view prediction is performed based on generated I pictures, thereby predictive-encoding other pictures.

Temporal prediction is performed using temporal correlation between images from a same view, i.e., in a same row. Inter-view prediction is performed using spatial correlation between images at a same point of time, i.e., in a same column.

In FIG. 1, each row shows an image sequence from each view for a multi-view image over time, and each column shows an image sequence from views 0, 1, 2, through to 7, sequentially from top to bottom. The view 0 is a base view and an image sequence in the first row is from the base view. Pictures included in the image sequence from the base view are predictive-encoded using only temporal prediction without using inter-view prediction.

Each column shows multi-view images at same point of time. Pictures included in columns 110, 120 and 130, in which an image from the base view is an I picture, are referred to as anchor pictures. The anchor pictures are encoded using only inter-view prediction.

Pictures included in the remaining columns except for the columns 110, 120 and 130 including I pictures are referred to as non-anchor pictures. The non-anchor pictures are predictive-encoded using both temporal prediction and inter-view prediction.

Among sequences illustrated in FIG. 1, a picture 141 in the second row and the fifth column will be taken as an example. Each block included in the picture 141 is predicted using inter-view prediction and temporal prediction. Since a prediction method may differ from block to block, reference should be made to pictures 142 and 143 in odd-numbered rows located adjacent to the picture 141 as well as pictures 111 and 121 that temporally precede or follow the picture 141, in order to predict the picture 141.

Similarly, according to the related art, the non-anchor pictures have to be predictive-encoded using inter-view prediction and temporal prediction that require reference to four pictures, resulting in low speed multi-view image encoding.

SUMMARY OF THE INVENTION

The present invention provides a method and apparatus for encoding and decoding a multi-view image in which sequences of a multi-view image can be efficiently encoded and decoded at high speed, and a computer-readable recording medium having recorded thereon a program for executing the methods.

According to one aspect of the present invention, there is provided a method of encoding a multi-view image. The method includes determining whether each of pictures included in sequences of the multi-view image, which will hereinafter be referred to as multi-view image sequences, is a reference picture referred to by other pictures included in the multi-view image sequences for inter-view prediction, and encoding the pictures using at least one of inter-view prediction and temporal prediction based on a determination result.

The encoding of the pictures may include encoding a parameter for each of the pictures, which indicates whether each of the pictures is the reference picture.

According to another aspect of the present invention, there is provided an apparatus for encoding a multi-view image. The apparatus includes a determination unit that determines whether each of pictures included in multi-view image sequences is a reference picture referred to by other pictures included in the multi-view image sequences for inter-view prediction, and an encoding unit that encodes the pictures using at least one of inter-view prediction and temporal prediction based on a determination result.

The encoding unit may encode information about reference pictures referred to by each of the pictures for at least one of inter-view prediction and temporal prediction based on the determination result.

According to another aspect of the present invention, there is provided a method of decoding a multi-view image. The method includes receiving a bitstream including information indicating whether each of pictures included in multi-view image sequences is a reference picture referred to by other pictures included in the multi-view image sequences for inter-view prediction and data about the multi-view image sequences, extracting the information and the data about the multi-view image sequences from the received bitstream, and decoding the data about the multi-view image sequences based on the extracted information.

The information may be included in a parameter for each of the pictures.

According to another aspect of the present invention, there is provided an apparatus for decoding a multi-view image. The apparatus includes an extraction unit that receives a bitstream including information indicating whether each of pictures included in multi-view image sequences is a reference picture referred to by other pictures included in the multi-view image sequences for inter-view prediction and data about the multi-view image sequences, and extracts the information and the data about the multi-view image sequences from the received bitstream, and a decoding unit that decodes the data about the multi-view image sequences based on the extracted information.

According to another aspect of the present invention, there is provided a method of encoding a multi-view image. The method includes selecting pictures to be encoded using inter-view prediction and temporal prediction from multi-view image sequences based on temporal levels, and encoding the selected pictures using inter-view prediction and temporal prediction and encoding the remaining pictures included in the multi-view image sequences using one of inter-view prediction and temporal prediction.

The selecting of the pictures may include selecting non-anchor pictures in temporal levels that are less than a predetermined value from among all the pictures included in the multi-view image sequences.

The encoding of the selected pictures may include encoding information about the selected pictures.

According to another aspect of the present invention, there is provided an apparatus for encoding a multi-view image. The apparatus includes a selection unit that selects pictures to be encoded using inter-view prediction and temporal prediction from multi-view image sequences based on temporal levels, and an encoding unit that encodes the selected pictures using inter-view prediction and temporal prediction and encodes the remaining pictures included in the multi-view image sequences using one of inter-view prediction and temporal prediction.

According to another aspect of the present invention, there is provided a method of decoding a multi-view image. The method includes receiving a bitstream including information about pictures encoded using inter-view prediction and temporal prediction from multi-view image sequences and data about the multi-view image sequences, extracting the information from the received bitstream, and decoding the data about the multi-view image sequences based on the extracted information.

The information may be included in a sequence parameter or a supplemental enhancement information (SEI) message.

According to another aspect of the present invention, there is provided an apparatus for decoding a multi-view image. The apparatus includes an extraction unit that receives a bitstream including information about pictures encoded using inter-view prediction and temporal prediction from multi-view image sequences and data about the multi-view image sequences, and extracts the information from the received bitstream, and a decoding unit that decodes the data about the multi-view image sequences based on the extracted information.

According to another aspect of the present invention, there is provided a computer-readable recording medium having recorded thereon a program for executing the method of encoding a multi-view image and the method of decoding a multi-view image.

BRIEF DESCRIPTION OF THE DRAWINGS

The above and other aspects of the present invention will become more apparent by describing in detail exemplary embodiments thereof with reference to the attached drawings, in which:

FIG. 5 illustrates syntax of a network abstraction layer (NAL) unit header according to an exemplary embodiment of the present invention;

FIGS. 6A and 6B illustrate syntax of a sequence parameter set according to an exemplary embodiment of the present invention;

FIGS. 6C and 6D illustrate syntax of a supplemental enhancement information (SEI) message according to an exemplary embodiment of the present invention;

DETAILED DESCRIPTION OF EXEMPLARY EMBODIMENTS

Figure 1:
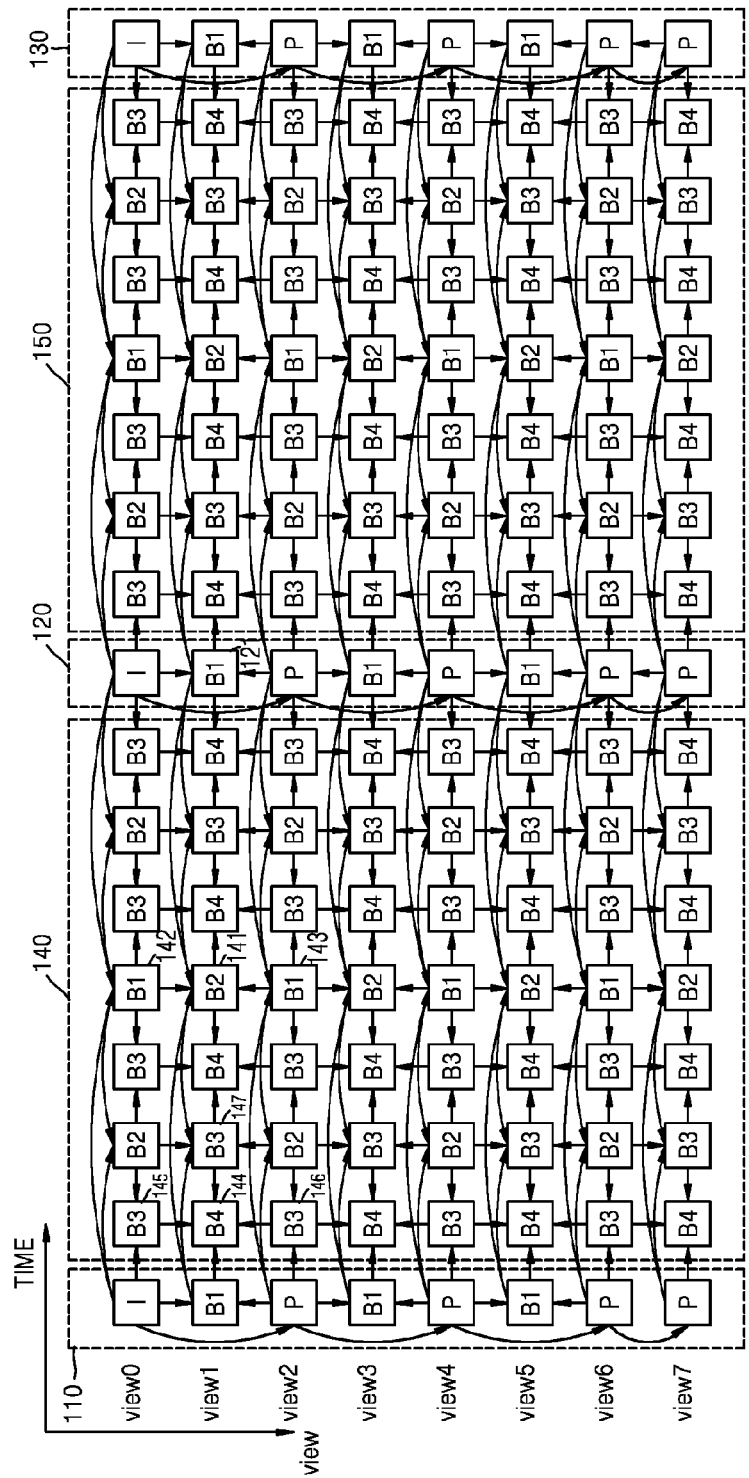
FIG. 1 illustrates sequences of a multi-view image according to a related art.

Hereinafter, exemplary embodiments of the present invention will be described in detail with reference to the accompanying drawings. It should be noted that like reference numerals refer to like elements illustrated in one or more of the drawings. In the following description of the present invention, detailed description of known functions and configurations incorporated herein will be omitted for conciseness and clarity.

Figure 2:
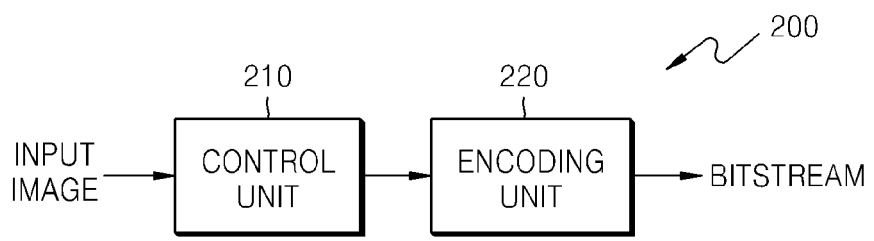
FIG. 2 is a block diagram illustrating an apparatus for encoding a multi-view image according to an exemplary embodiment of the present invention.

FIG. 2 is a block diagram illustrating an apparatus 200 for encoding a multi-view image according to an exemplary embodiment of the present invention.

Referring to FIG. 2, the apparatus 200 includes a control unit 210 and an encoding unit 220.

According to an exemplary embodiment of the present invention, the control unit 210 determines whether pictures included in sequences of a multi-view image (which will hereinafter be referred to as multi-view image sequences) are reference pictures that are referred to by other pictures included in the multi-view image sequences for inter-view prediction.

The multi-view image sequences are predictive-encoded using temporal correlation between temporally adjacent pictures and spatial correlation between pictures from adjacent views. Some of the multi-view image sequences may have high temporal correlation and low spatial correlation. In this case, inter-view prediction using spatial correlation for all the non-anchor pictures as illustrated in FIG. 1 only increases the time required for multi-view image encoding, without contributing to an improvement in compression rate.

Thus, the apparatus 200 for encoding the multi-view image according to an exemplary embodiment of the present invention performs predictive-encoding by performing inter-view prediction only on some non-anchor pictures instead of on all non-anchor pictures. To this end, the control unit 210 determines whether each picture included in the multi-view image sequences serves as a reference picture used for inter-view prediction. In other words, the control unit 310 determines whether each picture is referred to by other pictures to be predictive-encoded by inter-view prediction.

According to another exemplary embodiment of the present invention, the control unit 210 selects pictures to be encoded using inter-view prediction and temporal prediction from the multi-view image sequences based on temporal levels. The control unit 210 selects which picture is to be encoded using inter-view prediction, instead of determining whether each picture is referred to by other pictures for inter-view prediction. According to the related art, all non-anchor pictures are predictive-encoded using inter-view prediction and temporal prediction. However, in order to encode only some non-anchor pictures using inter-view prediction according to the present invention, pictures to be encoded using inter-view prediction and temporal prediction are selected from the multi-view image sequences based on temporal levels.

A temporal level is a parameter for providing temporal scalability by dividing an image sequence into a plurality of levels in order to allow only some of the levels to be selected and decoded during image decoding, as will be described in detail with reference to FIG. 3.

Figure 3:
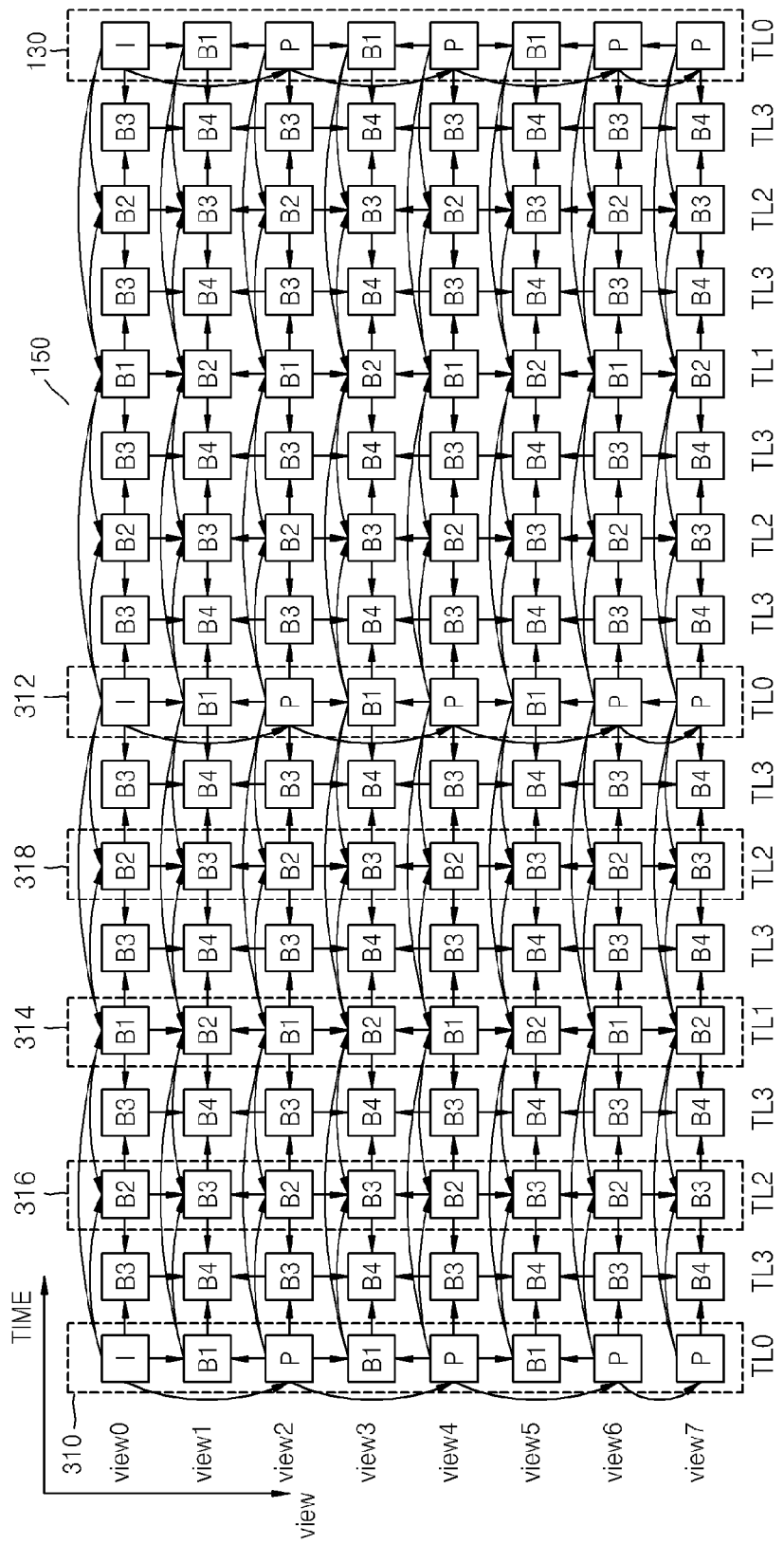
FIG. 3 illustrates temporal levels of sequences of a multi-view image according to an exemplary embodiment of the present invention.

FIG. 3 illustrates temporal levels of multi-view image sequences according to an exemplary embodiment of the present invention.

Referring to FIG. 3, temporal levels of anchor pictures 310 and 312 in the multi-view image sequences are '0'. Temporal levels of pictures 314 interposed between the anchor pictures 310 and the anchor pictures 312 are '1'. Temporal levels of pictures 316 and 318 interposed between pictures in a temporal level of '0' and pictures in a temporal level of '1' are '2'. Temporal levels of the remaining pictures of the multi-view image sequences are '3'.

Figure 4A:
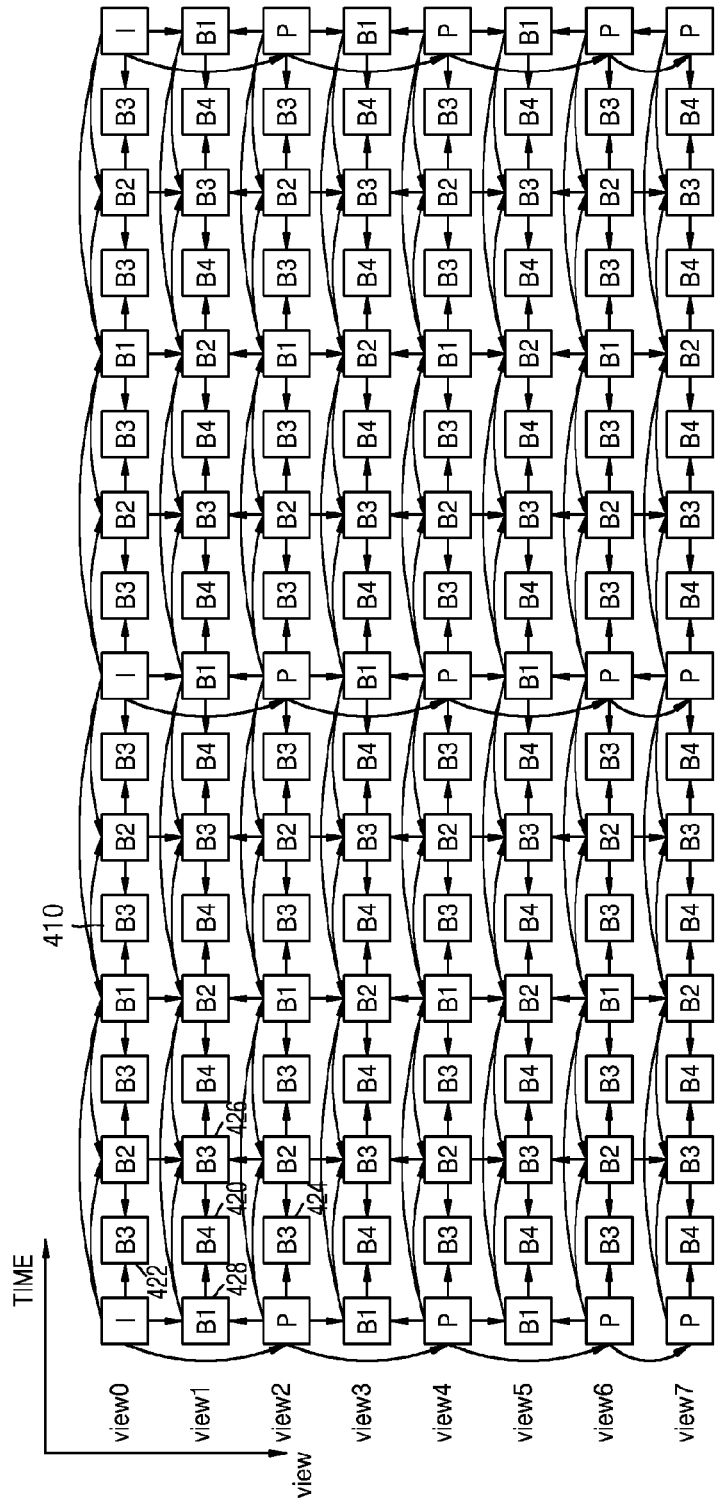
FIG. 4A illustrates sequences of a multi-view image according to an exemplary embodiment of the present invention.

FIG. 4A illustrates multi-view image sequences according to an exemplary embodiment of the present invention.

The multi-view image sequences illustrated in FIG. 4A are generated by the determination of the control unit 210 as to whether each picture included in the multi-view image sequences is referred to for inter-view prediction or by the selection of the control unit 210 regarding pictures to be encoded using inter-view prediction and temporal prediction. Thus, the multi-view image sequences illustrated in FIG. 4A are different from those according to the related art illustrated in FIG. 1.

For example, in the multi-view image sequences according to the related art illustrated in FIG. 1, a picture 144 in the second row and second column refers to a picture 145 in the first row and second column and a picture 146 in the third row and second column for inter-view prediction. In other words, the picture 145 in the first row and second column and the picture 146 in the third row and second column are reference pictures for inter-view prediction of the picture 144.

However, in the multi-view images according to the exemplary embodiment of the present invention illustrated in FIG. 4A, a picture 420 in the second row and second column does not refer to a picture 422 in the first row and second column and a picture in the third row and second column for inter-view prediction. Instead, the picture 420 refers to only a picture 426 in the second row and third column and a picture 428 in the second row and first column for temporal prediction.

In the multi-view image sequences according to the related art illustrated in FIG. 1, all pictures in odd-numbered rows from among non-anchor pictures are referred to by other pictures for inter-view prediction. However, in the multi-view image sequences according to the exemplary embodiment of the present invention illustrated in FIG. 4A, only some of pictures in odd-numbered rows from among non-anchor pictures are referred to by other pictures for inter-view prediction. In other words, in FIG. 4A, only non-anchor pictures in odd-numbered columns from among non-anchor pictures in odd-numbered rows are encoded using inter-view prediction.

Figure 4B:
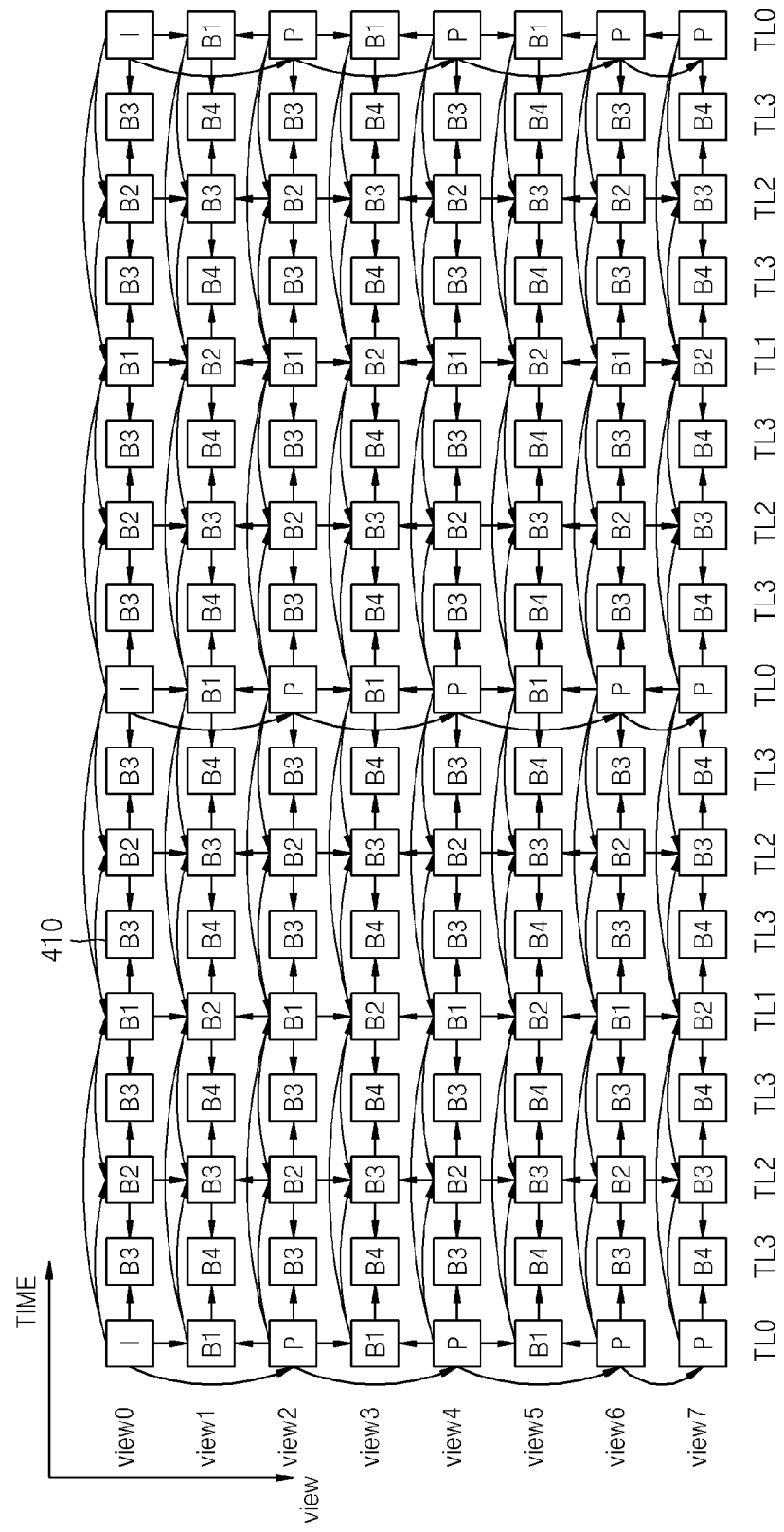
FIG. 4B illustrates sequences of a multi-view image and their temporal levels according to an exemplary embodiment of the present invention.

FIG. 4B illustrates multi-view image sequences and temporal levels according to an exemplary embodiment of the present invention.

A way to select some pictures included in the multi-view image sequences for encoding only the selected pictures using inter-view prediction as in FIG. 4A will now be described with reference to FIG. 4B.

In FIG. 4B, pictures to be referred to for inter-view prediction are determined based on temporal levels. In FIG. 4B, non-anchor pictures in a temporal level of '3' are determined not to be encoded using inter-view prediction. In other words, only pictures in temporal levels that are less than a predetermined value are selected to be encoded using inter-view prediction and temporal prediction from among non-anchor pictures.

The temporal levels that serve as a criterion for the determination or selection of the control unit 210 vary according to the characteristics of the multi-view image sequences, without being limited to those illustrated in FIG. 4B. For example, when spatial correlation between views is not high because of a large distance between cameras that photograph a multi-view image, it is not necessary to predict all non-anchor pictures using inter-view prediction. In this case, only pictures in temporal levels of 1 or less may be predicted using inter-view prediction, and in an extreme case, non-anchor pictures may be predicted without using inter-view prediction.

Referring back to FIG. 2, according to an exemplary embodiment of the present invention, the encoding unit 220 encodes the multi-view image sequences based on the determination or selection result of the control unit 210. In other words, the encoding unit 220 predictive-encodes the multi-view image sequences using at least one of inter-view prediction and temporal prediction based on the determination or selection result of the control unit 210.

The encoding unit 220 predicts each picture included in the multi-view image sequences and subtracts a prediction value of each picture from the original picture, thereby generating residual data of the multi-view image sequences.

For prediction, the encoding unit 220 stores reference pictures in a predetermined memory and performs inter-view prediction or temporal prediction by referring to the stored reference pictures. According to the related art, when non-anchor pictures are predicted, all pictures for inter-view prediction and temporal prediction should be stored in the memory. However, according to the present invention, it is not necessary to store reference pictures for inter-view prediction in the memory for pictures determined by the control unit 210 not to be encoded using inter-view prediction.

For example, in order to encode the picture 420 in the second row and second column in FIG. 4A, pictures 422 and 424 located above and below the picture 420 at adjacent views to that of the picture 420 are not reference pictures for inter-view prediction and thus are not required to be stored in the memory, thereby allowing efficient use of the memory.

The pictures that are determined by the control unit 210 not to be referred to for inter-view prediction are not referred to for inter-view prediction, thereby speeding up prediction.

Referring back to FIG. 2, according to an exemplary embodiment of the present invention, when the encoding unit 220 predictive-encodes the multi-view image sequences, it also encodes a parameter indicating the determination result of the control unit 210 as to whether each picture is a reference picture used for inter-view prediction, and inserts the encoded parameter into a bitstream. Once the control unit 210 determines whether each picture is referred to for inter-view prediction, the encoding unit 220 encodes information about the determination result of the control unit 210.

Since determination is performed for determining whether each picture is to be referred to by other pictures for inter-view prediction, information about whether each picture is to be referred to by other pictures for inter-view prediction is included in a parameter for each picture.

FIG. 5 illustrates syntax of a network abstraction layer (NAL) unit header according to an exemplary embodiment of the present invention.

An NAL unit is the unit of packetization of image data. Since one NAL unit generally includes data about a single picture, information about whether each picture is referred to by other pictures for inter-view prediction is included in an NAL unit header in order to be encoded.

Referring to FIG. 5, a syntax element 'nal_ref_idc_view' is added to an NAL unit header according to the related art, thereby indicating whether each picture is referred to by other pictures for inter-view prediction. For example, 'nal_ref_idc_view=1' means that a corresponding picture is referred to by other pictures for inter-view prediction and 'nal_ref_idc_view=0' means that the picture is not referred to by other pictures for inter-view prediction.

Since new bits are assigned to 'nal_ref_idc_view', a syntax element 'reserved_zero_four_bits' is also added to change the number of reserved bits.

Referring back to FIG. 2, when the encoding unit 220 performs encoding, it also encodes information about reference pictures referred to by each picture for inter-view prediction and temporal prediction. A syntax element 'RefPicList' indicates such information. Since the control unit 210 determines whether each picture serves as a reference picture used for inter-view prediction, pictures that do not serve as reference pictures for inter-view prediction are not referred to by other pictures when the encoding unit 220 encodes the multi-view image sequences.

Thus, when the encoding unit 220 encodes information about reference pictures for each picture, it can generate 'RefPicList' excluding pictures that are determined by the control unit 210 not to be referred to for inter-view prediction.

For example, when the picture 420 illustrated in FIG. 4A is encoded according to the related art, the pictures 422 and 424 located above and below the picture 420 at adjacent views to that of the picture 420 are reference pictures and information regarding the pictures 422 and 424 is included in 'RefPicList'. However, according to an exemplary embodiment of the present invention, information about the pictures 422 and 424 determined by the control unit 210 not to be reference pictures for the picture 420 is not included in 'RefPicList'.

According to another exemplary embodiment of the present invention, the encoding unit 220 also encodes information about pictures selected by the control unit 210 to be encoded using inter-view prediction and temporal prediction and inserts the encoded information into a bitstream, as will be described in detail with reference to FIGS. 6A and 6B.

FIG. 6A illustrates syntax of a sequence parameter set according to an exemplary embodiment of the present invention.

Referring to FIG. 6A, the encoding unit 220 may include information for specifying pictures selected by the control unit 210 in a sequence parameter set and encode the sequence parameter set. The sequence parameter set according to the present invention includes a syntax element 'temporal_level_max' and a syntax element 'use_interview_pred_temporal_level[i]'.

'temporal_level_max' is information indicating the number of different temporal levels of multi-view image sequences encoded by the apparatus 200 for encoding a multi-view image. The multi-view image sequences illustrated in FIG. 3B have temporal levels from '0' to '3', and thus 'temporal_level_max' is '3'.

'use_interview_pred_temporal_level[i]' is information for specifying pictures to be predictive-encoded using inter-view prediction and temporal prediction. When inter-view prediction is performed on only pictures in a temporal_level of '1' or '2' as in FIG. 4B, 'use_interview_pred_temporal_level[1]' is '1' and 'use_interview_pred_temporal_level[2]' is '1'. 'use_interview_pred_temporal_level[3]' may be set to '0'. The values '0' and '1' are flag information indicating whether pictures in a corresponding temporal level are predicted using inter-view prediction.

Pictures in a temporal level of '0' are anchor pictures. Since the anchor pictures are predictive-encoded using only inter-view prediction, 'use_interview_pred_temporal_level[0]' is not separately set.

FIG. 6B illustrates syntax of a sequence parameter set according to another exemplary embodiment of the present invention.

In FIG. 4B, the control unit 210 selects pictures to be predictive-encoded using inter-view prediction and temporal prediction based on temporal levels. In other words, pictures in a particular temporal level are not temporally predicted. However, those pictures may also be selected based on views as well as temporal levels.

For example, pictures in a temporal level of '1' or '2' from among pictures in a multi-view image sequence from a view 1 are inter-view predicted and temporally predicted, and pictures in a temporal level of 1 from among pictures in a multi-view image sequence from a view 3 are inter-view predicted and temporally predicted. In other words, pictures to be inter-view predicted and temporally predicted are selected separately for each view. In this case, a syntax element for specifying selected pictures for each view is required.

Referring to FIG. 6B, the sequence parameter set includes syntax elements 'temporal_level_max' and 'use_interview_pred_temporal_level[i][j]'.

'temporal_level_max' is the same as 'temporal_level_max' illustrated in FIG. 6A, but 'use_interview_pred_temporal_level[i][j]' is different from 'use_interview_pred_temporal_level[i]' illustrated in FIG. 6A.

In 'use_interview_pred_temporal_level[i][j]', 'i' indicates a view and 'j' indicates a temporal level. As mentioned above, it is assumed that pictures in a temporal level of '1' or '2' from among pictures in a multi-view image sequence from a view 1 are inter-view predicted and temporally predicted, and pictures in a temporal level of '1' from among pictures in a multi-view image sequence from a view 3 are inter-view predicted and temporally predicted.

In this case, 'use_interview_pred_temporal_level[1][1]' is '1', 'use_interview_pred_temporal_level[1][2]' is '1', 'use_interview_pred_temporal_level[1][3]' is '0', 'use_interview_pred_temporal_level[3][1]' is '1', 'use_interview_pred_temporal_level[3][2]' is '0', and 'use_interview_pred_temporal_level[3][3]' is '0'. The values '0' and '1' are flag information indicating whether pictures in a corresponding temporal level in a multi-view image sequence from a corresponding view are predicted using inter-view prediction as in FIG. 6A.

FIG. 6C illustrates a supplemental enhancement information (SEI) message according to an exemplary embodiment of the present invention.

Referring to FIG. 6C, the encoding unit 220 may include information for specifying pictures selected by the control unit 210 in the SEI message and encode the SEI message.

The SEI message is additional information required to decode a video coding layer and may include timing information for each picture, information about pan/scan functions, and information required for random access. The SEI message may also include information separately defined by a user. The SEI message according to the exemplary embodiment of the present invention includes information for specifying pictures selected by the control unit 210 for inter-view prediction.

In FIG. 6C, 'temporal_level_max' and 'use_interview_prediction temporal_level[i]' are the same as those in FIG. 6A.

FIG. 6D illustrates an SEI message according to another exemplary embodiment of the present invention.

In FIG. 6D, 'temporal_level_max' and 'use_interview_prediction temporal_level[i][j]' are the same as those in FIG. 6B.

Figure 7:
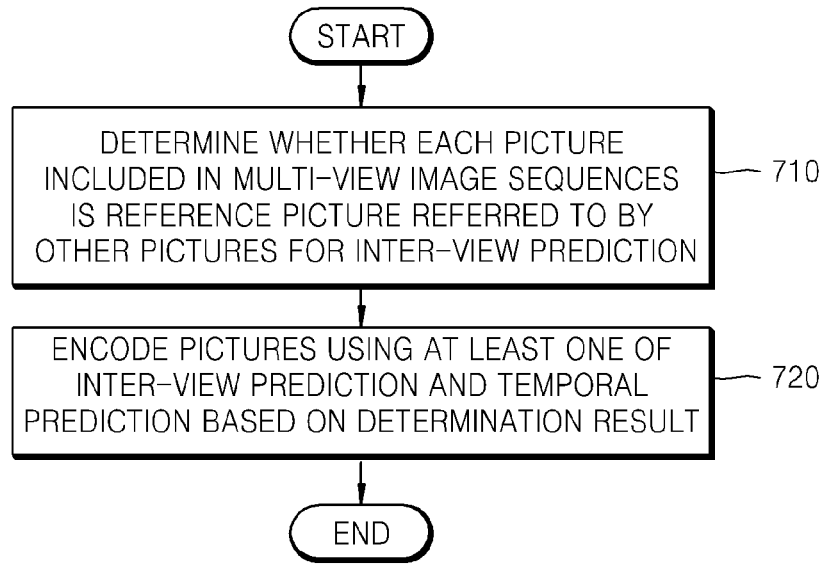
FIG. 7 is a flowchart illustrating a method of encoding a multi-view image according to an exemplary embodiment of the present invention.

FIG. 7 is a flowchart illustrating a method of encoding a multi-view image according to an exemplary embodiment of the present invention.

Referring to FIG. 7, in operation 710, the apparatus 200 for encoding a multi-view image illustrated in FIG. 2 determines whether each picture included in multi-view image sequences is a reference picture used for inter-view prediction. In other words, it is determined whether each picture is referred to by other pictures included in the multi-view image sequences for inter-view prediction.

In the method of encoding a multi-view image according to the exemplary embodiment of the present invention, only some non-anchor pictures are predicted using inter-view prediction instead of predictive-encoding all the non-anchor pictures using inter-view prediction. Thus, only some pictures are referred to by other pictures for inter-view prediction. To this end, it is determined whether each picture is referred to by other pictures for inter-view prediction in operation 710. Reference pictures used for inter-view prediction may be determined based on temporal_levels.

In operation 720, the apparatus 200 encodes pictures in the multi-view image sequences using at least one of inter-view prediction and temporal prediction based on the determination of operation 710.

Each of the pictures in the multi-view image sequences are predicted using at least one of inter-view prediction and temporal prediction and a prediction value of each of the pictures is subtracted from the original picture, thereby generating residual data of the multi-view image sequences.

Inter-view prediction is performed without referring to pictures determined, in operation 710, not to be reference pictures used for inter-view prediction, thereby speeding up prediction and allowing efficient memory use.

In multi-view image sequence encoding, information about pictures determined, in operation 710, to be reference pictures used for inter-view prediction is also encoded and inserted into a bitstream. More specifically, information indicating whether each picture is a reference picture used for inter-view prediction is inserted into a parameter for each picture. The information may be included in an NAL unit header in order to be encoded, as mentioned above.

Figure 8:
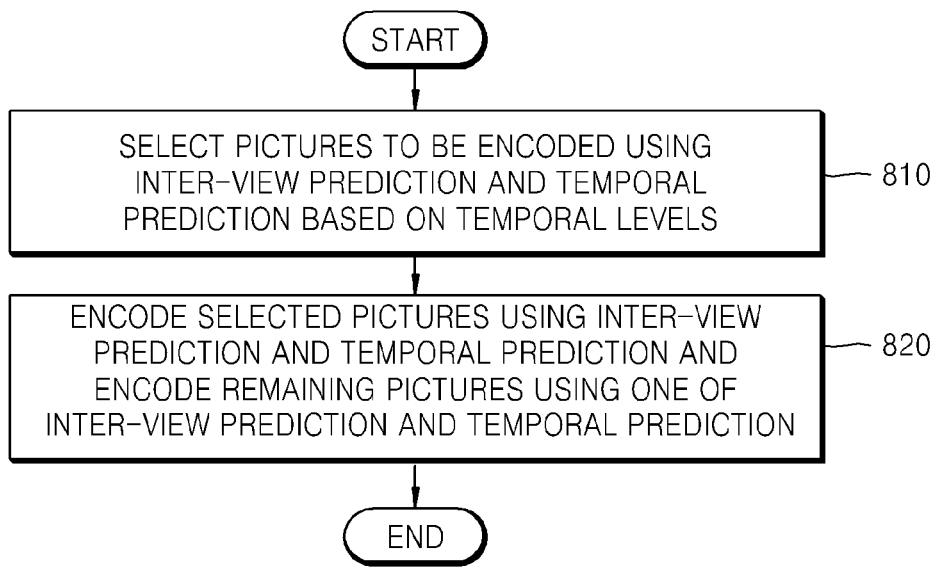
FIG. 8 is a flowchart illustrating a method of encoding a multi-view image according to another exemplary embodiment of the present invention.

FIG. 8 is a flowchart illustrating a method of encoding a multi-view image according to another exemplary embodiment of the present invention.

Referring to FIG. 8, the apparatus 200 for encoding a multi-view image illustrated in FIG. 2 selects pictures to be encoded using inter-view prediction and temporal prediction based on temporal levels in operation 810. The apparatus 200 may also select the pictures to be encoded using inter-view prediction and temporal prediction for each view of the multi-view image sequences. More specifically, non-anchor pictures in a temporal level less than a predetermined value are selected as the pictures to be encoded using inter-view prediction and temporal prediction.

In operation 820, the apparatus 200 encodes multi-view image sequences based on the selection result of operation 810. More specifically, the pictures selected in operation 810 are predictive-encoded using inter-view prediction and temporal prediction, and the remaining pictures in the multi-view image sequences are predictive-encoded using one of inter-view prediction and temporal prediction. While all non-anchor pictures in the multi-view image sequences are predictive-encoded using inter-view prediction and temporal prediction according to the related art, only some of the non-anchor pictures are predictive-encoded using inter-view prediction and temporal prediction according to the exemplary embodiment of the present invention, thereby speeding up multi-view image encoding.

During multi-view image sequence encoding, information about the pictures selected for inter-view prediction in operation 810 is also encoded and inserted into a bitstream. As mentioned previously, the information may be encoded in the form of a sequence parameter or an SEI message and inserted into a bitstream.

Figure 9:
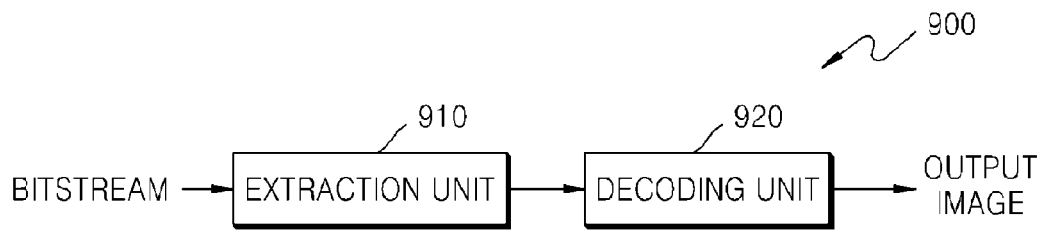
FIG. 9 is a block diagram illustrating an apparatus for decoding a multi-view image according to an exemplary embodiment of the present invention.

FIG. 9 is a block diagram illustrating an apparatus 900 for decoding a multi-view image according to an exemplary embodiment of the present invention.

Referring to FIG. 9, the apparatus 900 includes an extraction unit 910 and a decoding unit 920.

The extraction unit 910 receives a bitstream including data about multi-view image sequences encoded by the method of encoding a multi-view image according to the present invention. Here, the data about the multi-view image sequences is residual data of the multi-view image sequences, and the bitstream includes information about whether each picture in the multi-view image sequences is a reference picture used for inter-view prediction or information about whether each picture has been encoded inter-view prediction and temporal prediction.

Upon receipt of the bitstream, the extraction unit 910 extracts information from the received bitstream. More specifically, the extraction unit 910 extracts a parameter indicating each picture is a reference picture used for inter-view prediction or a parameter indicating each picture has been encoded using inter-view prediction and temporal prediction. Preferably, but not necessarily, the extraction unit 910 extracts information included in an NAL unit header, a sequence parameter, or an SEI message.

The decoding unit 920 decodes data about the multi-view image sequences based on the information extracted by the extraction unit 910. The data about the multi-view image sequences included in the bitstream is the residual data of the multi-view image sequences.

Thus, the decoding unit 920 predicts each picture in the multi-view image sequences using at least one of inter-view prediction and temporal prediction based on the information extracted by the extraction unit 910, and adds the prediction result to the residual data of the multi-view image sequences, thereby reconstructing the multi-view image sequences.

For prediction, the decoding unit 920 stores reference pictures in a predetermined memory and performs prediction. However, for inter-view prediction, the apparatus 900 does not store pictures that are not reference pictures used for inter-view prediction in the memory based on the information extracted by the extraction unit 910. Thus, the number of reference pictures to be stored in the memory is reduced during prediction, thereby allowing the efficient use of the memory.

Moreover, all non-anchor pictures are not inter-view predicted, thereby improving prediction speed. Furthermore, fast random access is possible. For example, when the picture 420 in the second row and second column in FIG. 4A is randomly accessed, it is not necessary to decode the pictures 422 and 424 located above and below the picture 420 at adjacent views to that of the picture 420 because they have already been determined not to be reference pictures used for inter-view prediction. Thus, fast prediction and random access are possible.

Figure 10:
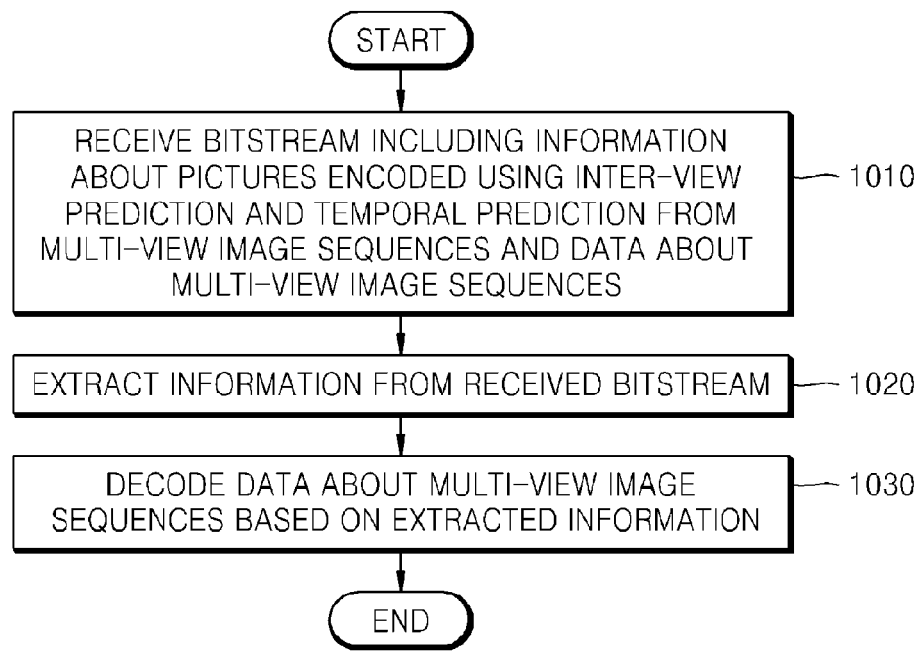
FIG. 10 is a flowchart illustrating a method of decoding a multi-view image according to an exemplary embodiment of the present invention.

FIG. 10 is a flowchart illustrating a method of decoding a multi-view image according to an exemplary embodiment of the present invention.

Referring to FIG. 10, the apparatus 900 for decoding a multi-view image in FIG. 9 receives a bitstream including data about multi-view image sequences in operation 1010. The data about the multi-view image sequences is residual data of the multi-view image sequences.

In operation 1020, the apparatus 900 extracts information indicating whether each picture included in the multi-view image sequences is a reference picture used for inter-view prediction or information indicating whether each picture has been encoded using inter-view prediction and temporal prediction from the received bitstream. The data about the multi-view image sequences, i.e., the residual data, is also extracted. To this end, information included in an NAL unit header, a sequence parameter, or an SEI message may be extracted.

In operation 1030, the apparatus 900 decodes the multi-view image sequences based on the information extracted in operation 1020. More specifically, the multi-view image sequences are predicted using at least one of inter-view prediction and temporal prediction based on the extracted information and the residual data extracted in operation 1020 is added to the prediction result, thereby reconstructing the multi-view image sequences.

In prediction, pictures determined not to be reference pictures used for inter-view prediction based on extracted information are not referred to for inter-view prediction. Since inter-view prediction can be efficiently performed at high speed, the speed of multi-view image decoding also increases.

As described above, according to the present invention, only some pictures included in multi-view image sequences are predictive-encoded and decoded using inter-view prediction during encoding and decoding of a multi-view image, thereby speeding up the encoding and decoding.

Moreover, when pictures that do not use inter-view prediction are predicted, only a small number of pictures are referred to, thereby allowing the efficient use of a memory required for predictive-encoding and decoding.

Meanwhile, the exemplary embodiments of the present invention can be written as computer programs and can be implemented in general-use digital computers that execute the programs using a computer readable recording medium or other transmission media. Examples of the computer readable recording medium include magnetic storage media (e.g., ROM, floppy disks, hard disks, etc.), and optical recording media (e.g., CD-ROMs, or DVDs). The other transmission media that can include carrier waves (e.g., transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. An apparatus for predictive-decoding a multi-view image, the apparatus comprising:
   a receiving unit that receives a bitstream comprising information indicating whether a picture in one view image sequence included in multi-view image sequences is a reference picture referred to by others in another view image included in the multi-view image sequences for inter-view prediction and data about the multi-view image sequences;
   an extraction unit that extracts the information and the data about the multi-view image sequences from the bitstream; and
   a decoding unit that decodes the data about the multi-view image sequences based on the extracted information,
   wherein the information is included in a network abstraction layer (NAL) unit header, and
   wherein a picture which is reference picture to by others in another view image sequence for inter-view prediction is included in a reference picture list and a picture which is not a reference picture referred to by others in another view image seguence for inter-view prediction is not included in the reference picture list.

* * * * *